Sept. 27, 1927.

C. ENGERT

SANDWICH FORK

Filed Aug. 30, 1926

Inventor
Charles Engert.
By Williams, Bradbury,
McCaleb & Hinkle.
Attorneys.

Patented Sept. 27, 1927.

1,643,708

UNITED STATES PATENT OFFICE.

CHARLES ENGERT, OF BERWYN, ILLINOIS.

SANDWICH FORK.

Application filed August 30, 1926. Serial No. 132,337.

My invention relates to forks and has for its object the provision of an improved culinary utensil of this class which is suitable for use in the preparation of sandwiches.

A further object is to provide a utensil of this class having means for holding the sandwich while it is being cut, and having means for guiding the knife being used therewith.

Other objects will appear from the following description, reference being had to the accompanying drawings in which.

Figure 1:
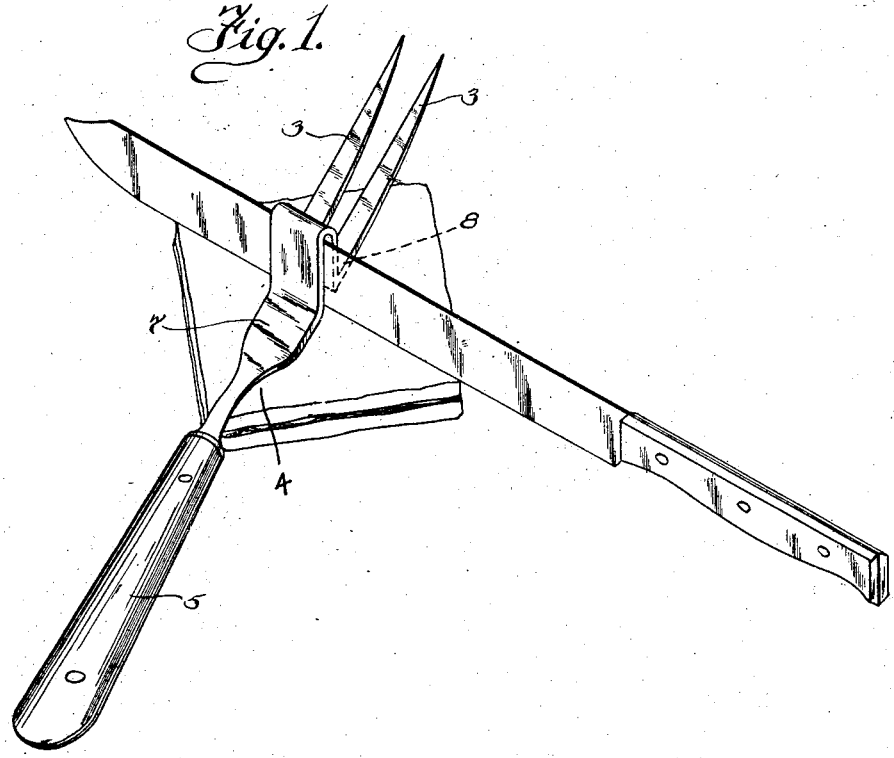
Figure 2:
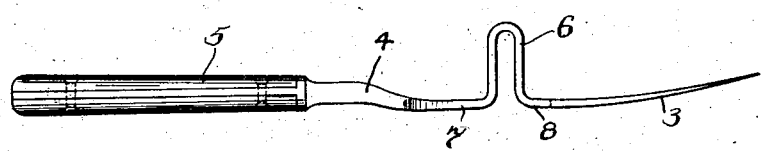

Figure 1 is a perspective view of my improved fork, illustrating its method of use; and Figure 2 is a side elevation of the fork.

In the preparation of sandwiches it is customary for the maker to cut the sandwich in half using the tines of a fork to hold the sandwich. In doing so the several layers of the severed half of the sandwich are often displaced relative to each other and thus make necessary an extra operation to replace them in position.

The fork of my invention is provided with means for holding the sandwich on each side of the knife by means of which it is being cut in half, and thus overcomes the above mentioned inconvenience and waste of time in the preparation of sandwiches.

The fork comprises a pair of tines 3 connected by a shank 4 to a suitable handle 5. The shank 4 has an inverted U-shaped bend 6 formed near the base of the tines to provide a recess for the knife blade. The shank includes a work holding face composed of the portions 7 and 8 adjacent the bend 6, which lie approximately in the same plane and are of relatively great area so that sufficient pressure may be exerted upon the sandwich to hold it in place while cutting it in half, without appreciably deforming its top layer. The recess formed between the sides of the bend 6 should be sufficiently wide to permit the fork to be quickly and easily placed over the knife blade but should be narrow enough so that the bend may serve as a guide for the knife. The recess should be of a depth nearly as great, or greater, than the width of the knife blade with which it is to be used.

In using the fork the layers of the sandwich are assembled in the usual manner and the knife placed in position for cutting the sandwich in half. The fork is then placed over the knife so that the surfaces of the shank portions 7 and 8 bear upon the upper layer with sufficient pressure to prevent the portions of the sandwich from being displaced while the sandwich is being cut. It will be apparent that in this manner the sandwich may be cut with great facility and without the loss of time usually occasioned by the necessity of replacing the displaced portion of the sandwich when using an ordinary fork to hold it in position while cutting. When using the tines of an ordinary fork to hold the sandwich while cutting it, the bread frequently sticks to the tines upon their attempted withdrawal from the bread, whereas, when using the fork of my invention, after cutting the sandwich, its severed portions will be in position, ready to be served.

While I have shown and described a single embodiment of my invention, it will be apparent that it may be embodied in other culinary utensils and that modifications may be made without departing from the principles thereof. I desire the scope of my invention to be limited only by the claims which follow.

I claim:

1. A culinary utensil comprising tines, a shank formed integral therewith, said shank having an inverted U-shaped bend the sides of which are substantially perpendicular to the shank to provide a recess and guide for a knife, and a handle on said shank.

2. A culinary implement having a work-holding face of substantial area and a U-shaped guide intermediate said face, said guide being adapted to receive and properly align a knife to be used in operating upon the work.

3. A fork having a U-shaped bend intermediate its tines and its handle, said bend having surfaces substantially perpendicular to the axis of said fork and adapted to guide a knife, and a surface adjacent said bend and adapted to bear upon the work on which the knife operates.

4. A device of the class described, having a work-holding face and knife guiding surfaces intermediate said face, said surfaces being perpendicular in all directions to the main axis of the device.

In witness whereof, I hereunto subscribe my name this 26 day of August, 1926.

CHARLES ENGERT.